(12) United States Patent
Mueller et al.

(10) Patent No.: US 10,003,643 B2
(45) Date of Patent: Jun. 19, 2018

(54) COMMUNICATIONS METHOD IN A COMMUNICATIONS SYSTEM

(71) Applicant: Robert Bosch GmbH, Stuttgart (DE)

(72) Inventors: Andreas Mueller, Waiblingen (DE); Timo Lothspeich, Gerlingen (DE); Volker Blaschke, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 14/428,447

(22) PCT Filed: Jul. 19, 2013

(86) PCT No.: PCT/EP2013/065271
§ 371 (c)(1),
(2) Date: Mar. 16, 2015

(87) PCT Pub. No.: WO2014/044434
PCT Pub. Date: Mar. 27, 2014

(65) Prior Publication Data
US 2015/0229716 A1    Aug. 13, 2015

(30) Foreign Application Priority Data
Sep. 19, 2012  (DE) .................. 10 2012 216 716

(51) Int. Cl.
*H04L 29/08*    (2006.01)
*H04L 12/403*    (2006.01)
(Continued)

(52) U.S. Cl.
CPC .... *H04L 67/1078* (2013.01); *G06F 17/30864* (2013.01); *H04L 12/403* (2013.01);
(Continued)

(58) Field of Classification Search
CPC ............... H04L 67/1078; H04L 12/403; G06F 17/30864
(Continued)

(56) References Cited

U.S. PATENT DOCUMENTS

2003/0152053 A1*  8/2003  Evans ................. H04L 27/2618
                                                                    370/338
2005/0266879 A1* 12/2005  Spaur ................. H04L 12/4625
                                                                    455/556.2
(Continued)

FOREIGN PATENT DOCUMENTS

DE    19909535    9/2000
WO     9825415    6/1998

OTHER PUBLICATIONS

Wikipedia, Phase-shift keying, Jan. 26, 2017, en.wikipedia.org (11 pages).*

(Continued)

*Primary Examiner* — Wing F Chan
*Assistant Examiner* — Leon Y Tseng
(74) *Attorney, Agent, or Firm* — Michael Best & Friedrich LLP

(57) ABSTRACT

The invention relates to a communications method that comprises the step of sending a query message from a central entity to at least one node. For every queried node, the central entity determines a node-specific time window based on a node-specific response time. The central entity filters out a response message, sent from the queried node, from the signals received during this time window. Based on the node-specific time window, the central entity assigns the response message to the queried node. The invention also relates to a computing unit that is configured to operate as a (Continued)

central entity, to a communications system, as well as to a computer program and a computer-readable storage program with said computer program.

19 Claims, 5 Drawing Sheets

(51) Int. Cl.
    *H04W 74/00*     (2009.01)
    *G06F 17/30*     (2006.01)
    *H04W 74/06*     (2009.01)
    *H04L 12/40*     (2006.01)

(52) U.S. Cl.
    CPC ....... *H04L 12/4035* (2013.01); *H04W 74/002* (2013.01); *H04W 74/06* (2013.01); *H04L 12/40143* (2013.01)

(58) Field of Classification Search
    USPC ........................................................ 709/204
    See application file for complete search history.

(56) References Cited

U.S. PATENT DOCUMENTS

2011/0238662 A1*   9/2011   Shuster ............. G06F 17/30554
                                                                                          707/728
2012/0198482 A1*   8/2012   Klein .................. G06F 11/3006
                                                                                           719/330

OTHER PUBLICATIONS

D-Link, DWL-G520+ Datasheet, Jun. 2004 (2 pages).*
Fang et al., "Two-Step Multipolling MAC Protocol for Wireless LANs," IEEE Journal on Selected Areas in Communications, IEEE Service Center, Piscataway, US, vol. 23, No. 6, Jun. 1, 2005, pp. 1276-1286.
International Search Report for Application No. PCT/EP2013/065271 dated Oct. 25, 2013 (English Translation, 3 pages).

* cited by examiner

COMMUNICATIONS METHOD IN A COMMUNICATIONS SYSTEM

BACKGROUND OF THE INVENTION

The present invention relates to two communication methods in communication systems, a computation unit that is set up to be incorporated into a communication system, a communication system, a computer program and a machine-readable storage medium.

Known packet-based communication systems comprise a plurality of nodes, a central entity (also called the "master" or "coordinator") and a jointly used transmission medium (also referred to as a "shared transmission medium" or "shared medium").

A basic problem for a packet-based communication system of this kind is controlling access to the "shared medium", because when the same resources are simultaneously being used by various nodes it is normally very unlikely the transmission will be successful (i.e. error-free). In this context, there are a large number of different degrees of freedom and possible manifestations and also many different optimization directions, for example for throughput, fairness, real-time capability, etc.

In general, it is possible to distinguish between competing and coordinated media access methods.

Competing methods can fundamentally involve two or more nodes simultaneously accessing the "shared medium" and wishing to transmit corresponding data, which then results in a collision on the shared transmission medium. Examples of this kind of method are (slotted) ALOHA, carrier sense multiple access (CSMA) and CSMA with collision detection (CSMA/CD, used in the Ethernet variants 10BASE5 and 10BASE2, inter alia).

In the case of competing media access methods such as CSMA/CD, very fast access to the "shared medium" is basically possible, but at the same time, even in the error-free case, there is no guarantee of successful access (in the sense of access that entails a successful transmission) being able to be effected within a prescribed time. The reason for this is that even during regular operation it is possible for collisions to arise at any time, which normally brings about an erroneous transmission. This probability of collision normally rises as the number of nodes increases and the volume of data increases, i.e. it correlates to the utilization level of the shared transmission medium. Therefore, such methods are generally unsuitable or have only limited suitability for real-time-critical data, which need to be transmitted within a certain time.

Furthermore, competing methods of this kind can sometimes alternatively be regarded as very critical if all or at least some of the nodes need to be supplied with power via the "shared medium" (e.g. via a wired bus), or if all or at least some of the nodes are powered by the same energy source (e.g. a battery). The reason is that in such a case, depending on the system design, it will be possible for the whole system or a portion thereof to fail on account of an excessively high power requirement if too many nodes wish to access the "shared medium" simultaneously. The reason for this is essentially that the power draw of a node is normally higher in transmission mode than in reception mode or in non-transmission mode.

Unlike in the case of competing methods, coordinated media access methods should not, in the error-free case, encounter any collisions as a result of a plurality of nodes simultaneously accessing the "shared medium". In this case, the media access can be coordinated statically, as in the case of static time-division multiplexing methods, for example, in which each node periodically has exclusive use of the "shared medium" for transmission for a certain time. By way of example, this can be effected using a statically stipulated schedule, which is known to all nodes, in conjunction with time synchronization of all nodes. Alternatively, the coordination can be implemented with the aid of control by a central entity, as in the case of a classic polling method, for example. Furthermore, distributed coordination is alternatively possible, this being used for methods such as "token ring" or "token bus", for example.

Coordinated methods normally have a more deterministic (i.e. more easily predictable) behavior than competing methods, and it is usually possible, at least to a certain extent, to guarantee maximum access times for the "shared medium". Particularly in the case of methods in which the coordination is effected by a central entity, these guaranteed maximum access times may be relatively long, however, particularly when there are a large number of nodes and/or there is a high volume of traffic. In the case of a cyclic polling method, for example, the central entity cyclically awards each node access to the "shared medium", with the maximum cycle time and hence the guaranteed maximum access time for the "shared medium" normally being directly proportional to the number of nodes and to the maximum possible volume of traffic.

Conventional coordinated methods can therefore be used to make heavy timing demands on at least some of the data to be transmitted (e.g. in the sense of comparatively short maximum access times) only for systems with a relatively small number of nodes.

A further subject for the design and realization of communication systems with a central control/supervisory entity (e.g. in the case of corresponding systems with coordinated media access methods) is the supply of said central entity with information about the nodes, for example in respect of the current state of a node or in respect of particular parameters. In conventional systems, this usually involves the interchange of special control messages between the central entity and the individual nodes. These control messages are in this case normally made up of a suitable preamble for synchronization, a message header and the actual control data and therefore often have a very large overhead, particularly if only one or a few information/control bit(s) need(s) to be transmitted. Furthermore, a node first of all needs to be provided with access to the "shared medium" before such a message is transmitted. The options already presented above come into consideration for this, in principle, but the outlay for obtaining even simple information contents is therefore often relatively high.

It is an object of the present invention to provide a communication method for a communication system that allows a high level of transmission reliability for relatively low outlay and, in particular, is suited to being used in communication systems having a large number of nodes. It is additionally an object to allow fast querying of states (particularly transmission requirements) for simultaneous minimum power draw by the nodes.

SUMMARY OF THE INVENTION

Both communication methods according to the invention can be used in a communication system that comprises a central entity, a plurality of nodes and a communication medium that the central entity and the nodes use jointly for communication. By way of example, the communication medium may be a linear or ring-shaped bus or a wireless transmission channel.

The first communication method according to the invention comprises a query message being sent from the central entity to one or more nodes in the communication system (which is/are then referred to as "interrogated node(s)"). The interrogated node(s) may be the only or may all be node(s) (different from the central entity) in the communication system or a selection of all nodes. If a plurality of nodes are interrogated, the query message can in this case be transmitted from the central entity, for example, to each interrogated node in the communication system or forwarded from one interrogated node to the next, so that the one query message (that is particularly the query message sent once) reaches all interrogated nodes.

By way of example, the query message can query a state (such as a transmission requirement or the priority of a transmission requirement or the priority of the highest-priority transmission requirement that exists) or particular other parameters or properties of the addressed (interrogated) nodes (e.g. whether the node is supplied with power via a dedicated source (e.g. a battery) or the power needs to be obtained via the shared transmission medium).

In the case of transmission of the priority of the highest-priority message that is to be transmitted, the central entity can ascertain said priority and can assign the transmission authorization to the individual nodes on the basis of the respective priority, for example by first of all awarding access to that/those node(s) that has/have indicated a high-priority transmission requirement, then to that/those node(s) having a medium-priority transmission requirement, etc.

The first communication method according to the invention additionally comprises, for each interrogated node, a node-specific time window being determined on the basis of a node-specific response time and a response message sent by the interrogated node being filtered out of signals received during the node-specific time window. On the basis of the respective node-specific time window, the central entity associates the response message with the individual interrogated node(s).

Preferably, the node-specific response time is a time difference, specific to the respective node, between the query message being received and a response message being sent by the node; this can be based on the instant of the end or beginning of receipt of the query message or on any other explicitly stipulated reference instant. The node-specific response time can be set automatically or manually in each case by means of appropriate configuration, for example using one or more configuration file(s) and/or in the course of network planning and/or installation. The node-specific response time(s) of the one interrogated node or of the plurality of interrogated nodes may have been announced to the central entity in advance. Alternatively, the central entity itself can assign and/or communicate the respective node-specific transmission time of the node(s) to the latter, as described further down.

A node-specific time window is preferably longer than the actual response time. This allows compensation for uncertainties regarding the signal propagation times required. Node-specific time windows of different nodes preferably do not overlap one another.

On account of the association of a response message with a node on the basis of the node-specific reception window thereof, the content of the response message does not need to be considered for the association. In particular, the response message does not need to contain any information about its sender.

The second communication method according to the invention comprises steps that are performed by a node, namely a query message that is sent by the central entity and that is preferably also directed to at least one further node in the communication system being received. Said communication method comprises a response message being sent to the central entity at a node-specific response time. Preferably, the node-specific response time is or has been explicitly or implicitly assigned and/or communicated to the node by the central entity, or each node is/has been configured manually in respect of its node-specific response time.

The methods according to the invention each comprise steps that can be executed by the different components "central entity" or "nodes". They can be combined with one another and each allow message interchange, which has the following advantages, in particular:

The methods according to the invention allow very short transmission times for the responses, since almost no overhead is needed (for example no preambles, destination addresses or other control/header information). Since, furthermore, a plurality of different nodes are queried with a single query message simultaneously, this allows a lower average power draw, a decrease in the maximum transmission latency, an increase in the possible throughput and fast querying, particularly in comparison with conventional polling methods. In the latter, each node is usually interrogated individually, which would normally take up significantly more time.

In contrast to a competing media access method, such as CSMA, there is a deterministic behavior and it is therefore possible to ensure that each interrogated node can at any rate send one response message within a prescribed time, for example in order to indicate a transmission requirement. In addition, in the error-free case, there is no danger of the network or at least a portion thereof collapsing if too many nodes have a transmission requirement simultaneously and the supply of power to these nodes is provided via the jointly used transmission medium, such as a wired bus, or if too many nodes have a transmission requirement simultaneously and all nodes or some of the nodes are supplied with power from the same source.

On account of the chronology of the response messages, which is clearly defined by means of the node-specific response times or time windows, the overhead required for the individual response messages can be kept to a minimum. In particular, no additional synchronization mechanisms and measures are necessary, such as the use of preambles. Since only state information can be transmitted and each node can itself decide whether this information is relevant to it or alternatively it is only ever the central entity that evaluates the corresponding state information, there is furthermore also no need for additional header information, which usually specifies the recipient of a message, for example, inter alia.

The methods according to the invention are very well suited to being able to meet certain demands on the quality of service (particularly latency and jitter) even for systems with a relatively large number of nodes.

In preferred embodiments, the respective response message is only a short signal train that has no preamble and no header. In this case, the (received) signals obtained from the central entity can contain not only the response message but also sections/samples without a useful signal, which thus merely contain noise, interference and/or other spurious signals.

The computation unit according to the invention is set up to be incorporated into a communication system as the central entity and to execute some or all steps of the methods described above or below. The communication system according to the invention accordingly comprises a central entity set up in such a way and/or one or more nodes that are set up to execute some or all of the steps cited here.

The cited methods may be implemented in the form of one or more computer programs that, when executed on a computer, prompt(s) the respective method to be performed. The computer program(s) may be stored on one or more machine-readable storage media.

Advantageously, the two methods according to the invention are combined. The node that executes the cited steps is an interrogated node in this case, that is to say one that has received the query message from the central entity.

The node-specific response times of the individual nodes are or have been preferably chosen such that, despite possible propagation time differences for the individual transmissions, no collisions between different response messages can occur on the shared transmission medium and the central entity can explicitly allocate each node a node-specific time window within which the central entity receives the response message from the corresponding node. This then in turn allows explicit association of a response message with a particular node.

Preferably, the central entity implicitly or explicitly assigns and/or communicates a node-specific response time for the response message to each of the interrogated nodes, e.g. during a special initialization phase.

In this case, implicit assignment can be realized such that the central entity stipulates just a logical order for the different nodes and communicates only the position of the node within this order to each node. Each node (and the central entity) can then use a previously stipulated computation specification to compute the respective response time.

In the case of explicit assignment, the central entity can allocate each node its node-specific response time directly.

As a further alternative to implicit or explicit signaling by the central entity, the node-specific response times can also be set at each node by a person during startup of the communication system (e.g. by setting appropriate values in a mass memory). The association of response times and corresponding explicit identifiers or addresses for the individual nodes can then be stored in the central entity.

For the association of the response message, the central entity can advantageously determine a node-specific reception time from the node-specific response time in advance (that is to say before the response messages are received). At or during this time, the central entity expects a response from the associated node and accordingly associates the response message received at or during this time with the node.

Preferably, the central entity determines, for each interrogated node, an instant or period at or during which it expects a response from the node. The central entity then associates a response message arriving at or during this time with the corresponding node.

Depending on the considered topology or type of the shared transmission medium, unknown propagation time differences may mean that the central entity can experience a certain fuzziness with regard to the instant at which it expects the response message from a particular node.

In the case of a linear bus or a wireless transmission channel, for example, it may be possible for the central entity to narrow down the expected reception instant just to a particular time window without being able to state precisely in advance precisely when within this time window the central entity will receive the response message from this node.

In the case of a perfectly self-contained linear bus, the central entity can associate the response messages with the queried nodes by determining or using a respective upper limit for the maximum (simple) signal propagation time to be expected, which is or has been ascertained on the basis of the bus length and the propagation speed, for example.

For the special case of a ring topology, in which the central entity can firstly place a message onto the bus and secondly simultaneously receive messages from the bus, such fuzziness does not exist, because in this case the different response messages are always received by the central entity simply in sequentially strung-together fashion.

Preferably, the response messages each comprise just a single (modulation) symbol, such as a wave train at a particular frequency, or just a sequence of a few (for example no more than 10) (modulation) symbols, such as a sequence of individual wave trains at possibly different frequencies.

In one preferred embodiment, the response messages are modulated differentially. This affords the advantage that, despite the possible fuzziness on account of propagation time differences, a high level of transmission reliability can be ensured, but it is simultaneously possible to dispense with additional overhead for producing time synchronization (for example in the form of a special preamble that could be placed in front of the actual information bit or modulation symbol in the case of a response message).

In a further preferred embodiment, a response message corresponds to a wave train of constant length at a prescribed frequency that is or has been selected from a set of predefined frequencies depending on the state to be transmitted; this corresponds to multilevel frequency shift keying at the transmitter end. In this case, spectral analysis of the signals received during the node-specific time window can then be performed at the reception end (e.g. using fast/discrete Fourier transformation), so that at the reception end it is possible to determine the transmission frequency of the signal train and hence the indicated state of the node.

Differential transmission can be effected using differential binary frequency shift keying, for example. To this end, the relevant node sends a wave-shaped (for example cosine-shaped (or sinusoidal)) signal first of all at a first frequency $f_1$ and then at a second frequency, which is different than the first frequency, $f_2 \neq f_1$. The central entity then need only establish whether a transition from a low to a high frequency or vice versa arises within the associated (fuzzy) reception window. It can therefore ascertain whether or not the node has a transmission requirement comparatively reliably with relative ease.

Alternatively, nondifferential transmission using binary or multilevel frequency shift keying can be effected. In the case of such nondifferential transmission using binary or multilevel frequency shift keying, the respective interrogated node transmits a wave-shaped (e.g. cosine-shaped or sinusoidal) signal at a frequency $f_i \in \{f_1, f_2, \ldots, f_M\}$, which is chosen on the basis of the information to be transmitted or the state to be transmitted and where M corresponds to the degree of modulation, i.e. to the number of states that can be distinguished using a (modulation) symbol, at the node-specific response time associated with said node. In the specific case of binary frequency shift keying, i.e. for M=2, the respectively interrogated node could, at the node-specific response time associated therewith, transmit, by way of example, a sinusoidal signal at a first frequency $f_1$ or at a second frequency $f_2$, which is different than the first frequency, depending on whether or not it has a transmission requirement. This signal can then be detected at the central entity using a correlation receiver, for example, or—as already described previously—using spectral analysis (e.g. using fast/discrete Fourier transformation) of the received signal received during the time window associated with the respective node. Furthermore, there are also a large number of further options for how such a response message can be transmitted. In principle, the use of all popular modulation methods is conceivable therefor. In particular, instead of a single modulation symbol (that, as outlined above, can be modulated using binary or multilevel frequency shift keying, for example), it is also possible to transmit sequences of such modulation symbols, that is to say sequences of single cosine-shaped or sinusoidal signal trains at different or the same frequencies, for example—depending on what data are meant to be transmitted.

In one advantageous embodiment, the query message respectively asks for a transmission requirement at the at least one node to which it is directed. Thus, what is asked is whether the interrogated node(s) need(s) to transmit one or more messages. Preferably, the response messages in this case merely indicate whether or not the relevant node has a transmission requirement. This information can be represented using a single bit. An embodiment in which the query relates only to transmission requirements for messages that are to be sent on a time-critical basis, i.e. messages that need to be transmitted within a certain time, is advantageous.

In a further advantageous embodiment, an interrogated node can transmit the priority of the highest-priority message that the node happily wishes to transmit. To this end, it is possible for three priority levels (low, medium, high) to be defined, for example, with each message to be transmitted having precisely one such priority level. The allocation of priority levels to messages can be performed by the respective application or on the basis of precisely stipulated criteria (e.g. on the basis of the waiting time hitherto or on the basis of a corresponding priority level/QoS class of relatively high protocol layers, such as IP), for example. In addition, a node can indicate in its response that it currently has no transmission requirement. In this case, there are therefore four different response options, which corresponds to two bits in the information theory. Advantageously, the response is then transmitted as described previously using multilevel frequency shift keying, i.e. the node sends a signal train of fixed length at a frequency $f_i \in \{f_1, f_2, f_3, f_4\}$, the choice of frequency being dependent on the state to be transmitted (e.g. low-priority transmission requirement, medium-priority transmission requirement, high-priority transmission requirement, no transmission requirement).

On the basis of the response messages, the central entity can ascertain one or more interrogated nodes that have registered a transmission requirement, and can award said node (or said nodes in succession) exclusive access to the shared transmission medium, which the relevant node can then use for sending its message(s) to another node or to the central entity. Preferably, the central entity informs each ascertained node in advance by means of a special communication about said award. The ascertained nodes can be addressed by the central entity preferably by means of an identifier, such as an MAC address.

Preferably, an exclusive opportunity for access for an ascertained node with a transmission requirement is temporary and ends when the at least one message is transmitted or after a stipulated period of time. It is then possible for the central entity to grant another ascertained node exclusive access to the shared transmission medium, for example, or said central entity can send a new query message or change over to another media access method, such as CSMA. It announces such a changeover preferably by sending a communication to the at least two interrogated nodes.

One embodiment of the invention comprises a combination of some or all of the steps cited above with an alternative media access method, such as carrier sense multiple access (CSMA) or a cyclic polling method. The central entity can ascertain, for example at regular intervals, whether one or more nodes need to send time-critical messages, e.g. messages for which timely transmission sometimes cannot be ensured using the basic access method. If a node indicates a transmission requirement for one or more such time-critical messages, the central entity can grant it exclusive access to the shared communication medium for this purpose. For non-time-critical messages, the basic media access method (that is to say CSMA, for example) can continue to be used.

This embodiment of the method is particularly suited to being better able to meet pre-existing (rigorous) demands on the quality of service of different packet transmissions. In particular, transmission requirements with rigorous timing demands for individual packets can be identified and handled preferentially.

Preferably, the response messages from the queried nodes each comprise just one bit. Alternatively, they can consist of a plurality of bits, each explicit combination of bits preferably having a respective associated quality of service class. Advantageously, the nodes can then indicate what quality of service class a highest-priority packet pending transmission has.

In a preferred embodiment, the method comprises a step of establishment, by the central entity, that a previously stipulated number of nodes in the communication system has been reached or exceeded. This makes it possible to ensure that the further steps, such as the sending of a query message and the association of the response messages, are suitable in the given instance.

Accordingly, the computation unit to be used as a central entity may be set up to check the number of nodes existent in the communication system, to select a basic access method (such as ALOHA, CSMA or CSMA/CD) if the number is below a prescribed limit and otherwise to execute some or all of the method steps described here.

The central entity can therefore match the use of one of the described methods to the respective situation autonomously and dynamically.

The methods described here are preferably initiated by the central entity. This allows simple configuration and control.

Further advantages and refinements of the invention will emerge from the description and the accompanying drawings.

It goes without saying that the features cited above and those yet to be explained below can be used not only in the respectively indicated combination but also in other combinations or on their own without departing from the scope of the present invention.

BRIEF DESCRIPTION OF THE DRAWINGS

The invention is schematically illustrated on the basis of exemplary embodiments in the drawings and is described in detail below with reference to the drawings.

DETAILED DESCRIPTION

Figure 1:
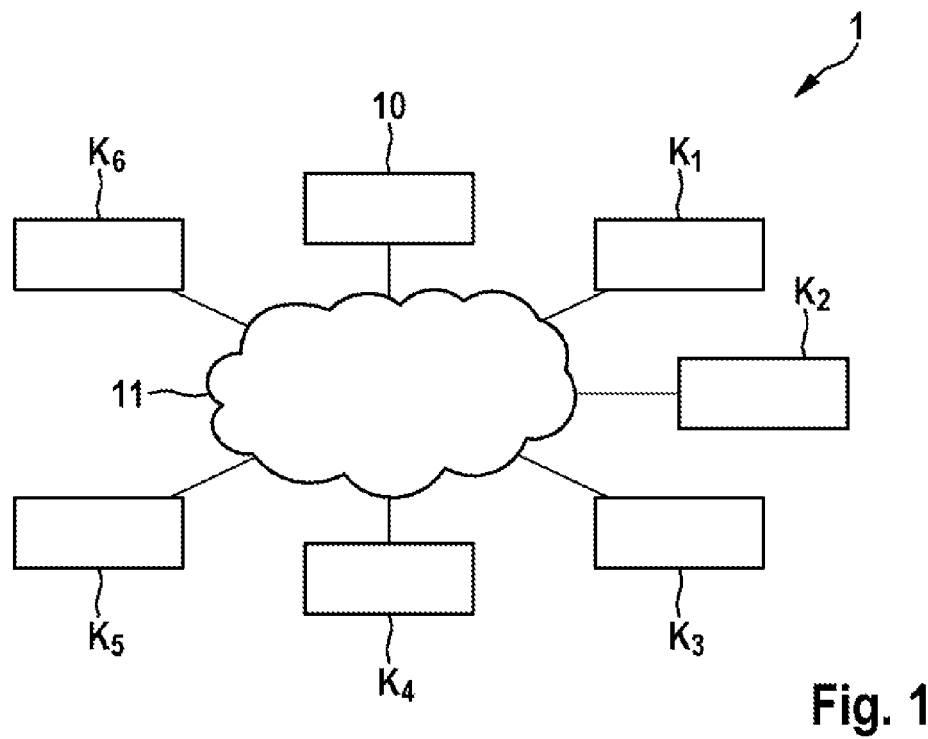
FIG. 1 shows an example of a communication system in which the present invention can be used.

The communication system 1 shown in FIG. 1 has a control entity 10, a plurality of nodes $K_1, K_2, K_3, K_4, K_5, K_6$ and a shared communication medium 11 that the nodes and the control entity can use to communicate with one another.

Figure 2:
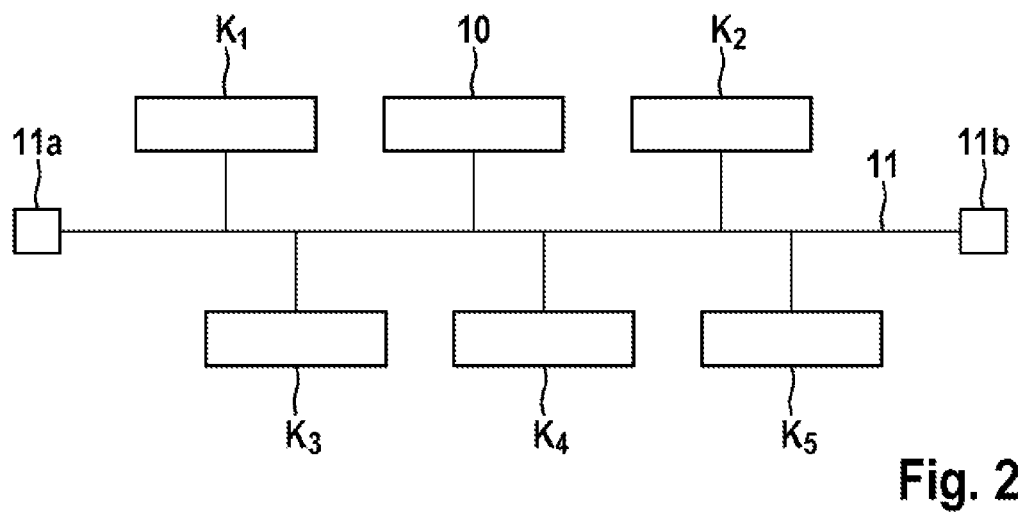
FIG. 2 shows an example of a typical arrangement of components in a communication system with a linear bus structure.

By way of example, the shared transmission medium may be a linear bus to which all nodes and the central entity are connected. This is outlined by way of example in FIG. 2; at points 11a and 11b, the bus 11 ends, for example with appropriate bus terminations. The bus terminations are normally impedances that are the same as the characteristic impedance of the line in order to avoid reflections. Furthermore, a multiplicity of further manifestations of the jointly used transmission medium are alternatively conceivable, such as a wireless transmission channel, a ring-shaped bus, etc. The only prerequisite is that the different nodes can, in principle, all use the same resources for data transmission, that is to say, by way of example, the same frequencies on an electrical line, the same wavelengths for an optical fiber, etc.

Figure 3:
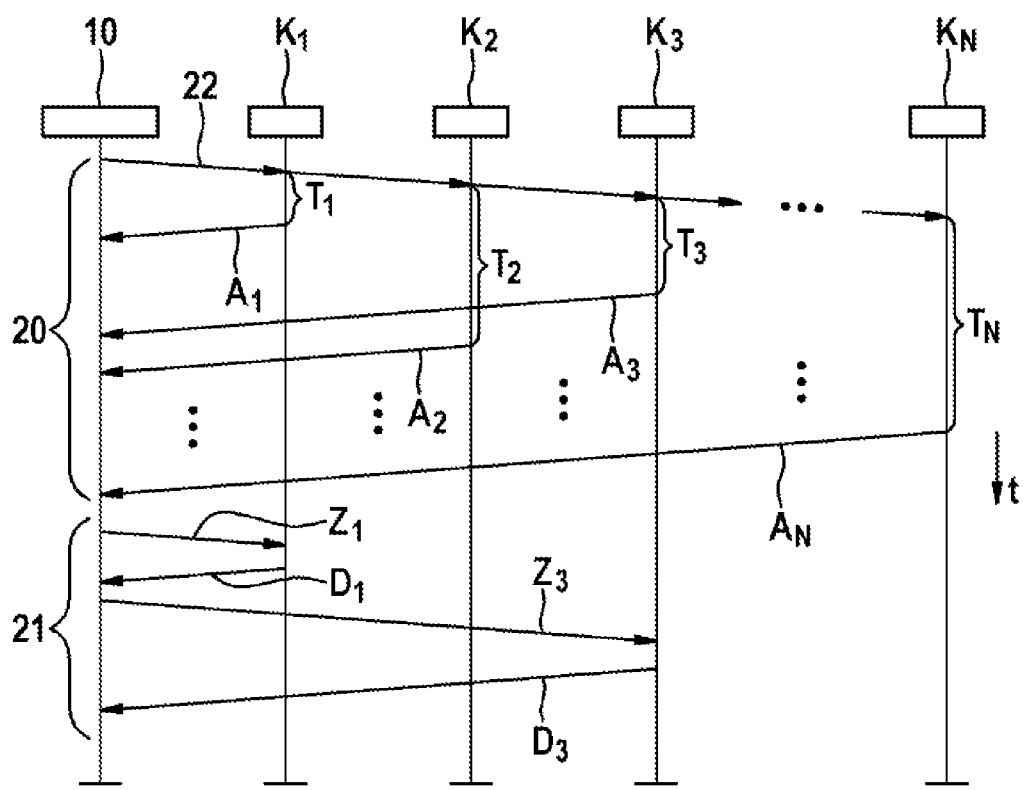
FIG. 3 shows an example of fundamental message interchange based on an embodiment of the present invention.

FIG. 3 shows a sequence diagram corresponding to an embodiment of the invention by way of example in its chronological order (represented from top to bottom). In addition to the central entity 10, the system being considered here collectively comprises the N nodes $K_1, K_2, K_3, \ldots K_N$, where N represents a natural number.

The diagram shows a phase 20, in which a fast status query is made by the central entity, and a phase 21, in which exclusive access to the shared communication medium is granted.

The phase 20 may be preceded by a phase, not shown, in which the communication system uses a basic access method, such as CSMA. Alternatively or additionally, after the phase 21 the central entity can send a message (not shown) to all nodes $K_1$ to $K_N$ heralding a transition to a basic media access method, which can then be used.

In the phase 20, the central entity 10 of the system first of all initiates a fast query for the transmission requirements of the individual nodes by sending a query message 22 that is received by all nodes $K_1, K_2, K_3, \ldots K_N$. For $n=1, \ldots, N$, each node $K_n$ sends an appropriate response message $A_n$ after its node-specific response time $T_n$ from complete reception of the query message 22 has expired. In the message $A_n$, the node $K_n$ respectively notifies the central entity of whether or not it has a transmission requirement; as has been mentioned above, in one embodiment of the invention, this involves communication of only such transmission requirements as relate to a time-critical message.

Alternatively or additionally, the node $K_n$ can use the message $A_n$ to transmit the priority of the highest-priority message to be transmitted (e.g. distinguished as {low, medium, high}) and/or indicate that it has no transmission requirement.

Following evaluation of the responses from the individual nodes, the central entity 10 then grants those nodes that have registered a transmission requirement explicitly exclusive access to the shared communication medium, so that these nodes can transmit their respective messages. To this end, the central entity sends a special message to the respective node, which can then itself transmit a message. As mentioned above, the central entity can take account of the respective priority for this.

In the example shown in FIG. 3, it is assumed that the nodes $K_1$ and $K_3$ each communicate a transmission requirement. In the message $Z_1$, the central entity notifies the node $K_1$ that it is being granted exclusive access to the shared communication medium. The node $K_1$ then sends the data $D_1$, which in the example shown are directed to the central entity 10. The central entity then similarly uses the message $Z_3$ to notify the node $N_3$ that it is now being granted exclusive access to the shared communication medium, which the node $K_3$ then subsequently uses for sending its data $D_3$, which in the example shown are likewise sent to the central entity.

Generally, a node that has been provided with exclusive access to the shared communication medium by means of a corresponding message can transmit its message either to the central entity (as shown in FIG. 3) or to any other node in the system. Following the transmission, control of the shared communication medium initially lies with the central entity again, which can therefore grant the next node, for example, exclusive access thereto or initiate a new query for the transmission requirements.

Figure 4:
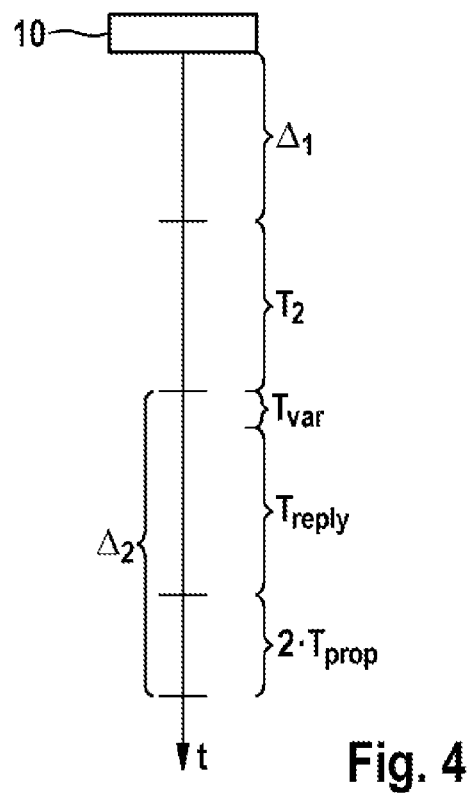
FIG. 4 shows a time window that a central entity can consider for association of a response message with a node.

FIG. 4 shows a time window $\Delta_2$ and the computation thereof by way of example for the node $K_2$ with the node-specific response time $T_2$. Response messages arriving at the central entity 10 in this time window are accordingly associated with node $K_2$. In this case, the central entity initially knows only that the response message from the node $K_2$ is received within this window, but does not know the precise instant (fuzziness in the order of magnitude of $2^*T_{prop}+T_{var}$).

The period of time $\Delta_1$ is required for the query message to be sent by the central entity to the node $K_2$. As explained above, the node $K_2$ then waits for the node-specific response time $T_2$ before it sends a response message to the central entity 10. The earliest possible instant at which the central entity can receive the response message from the node $K_2$ is thus after the specific response time $T_2$ of this node, measured from the beginning of reception of the query message or from effected complete transmission thereof, expires. The latest possible instant at which the central entity can begin to receive the response message is $T_2+2^*T_{prop}+T_{var}$ after the query message is sent, where $T_{var}$ is an interval of time that allows one or more practical effects that can lead to timing differences, such as oscillator inaccuracies and/or drifts, to be taken into account. In this case, $T_{var}$ may be a fixed value (e.g. based on a specification) or can be stipulated by the central entity dynamically and communicated to the individual nodes. $T_{prop}$ is the maximum (simple) signal propagation time to be expected; in the case of a wired linear bus, it is obtained from the propagation speed on the medium and the length of the bus. The end instant of the reception window is accordingly (again measured from the complete sending effected for the query message) $T_2+T_{reply}+2^*T_{prop}+$ $T_{var}$, with $T_{reply}$ as the period of time that is needed for the actual transmission of the response message.

Figure 5:
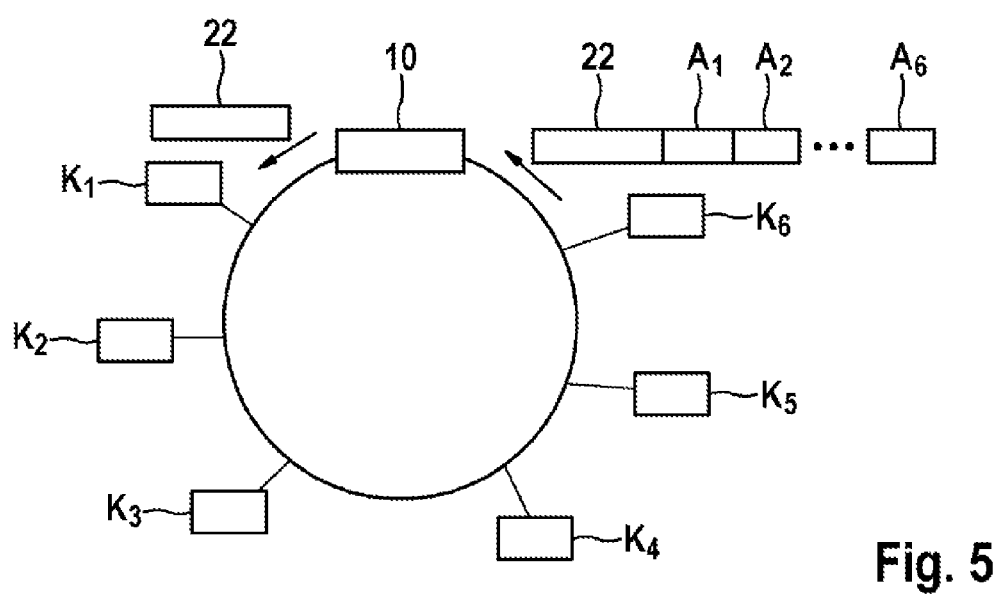
FIG. 5 shows the sending of messages when the shared communication medium has a ring structure that is suitable for a method according to the invention.

FIG. 5 shows an example of the special case in which the nodes $K_1$ to $K_6$ and the central entity 10 are arranged in a ring topology. In this arrangement, the central entity can firstly place a message (e.g. the query message 22) onto the bus and secondly simultaneously receive messages from the bus. The response messages $A_1$ to $A_6$ from the various nodes can each be successively appended to the query message during the pass of the ring in this arrangement.

In this case, the association of the response messages with the nodes can also be made without determining a time window, as shown in FIG. 3.

Figure 6:
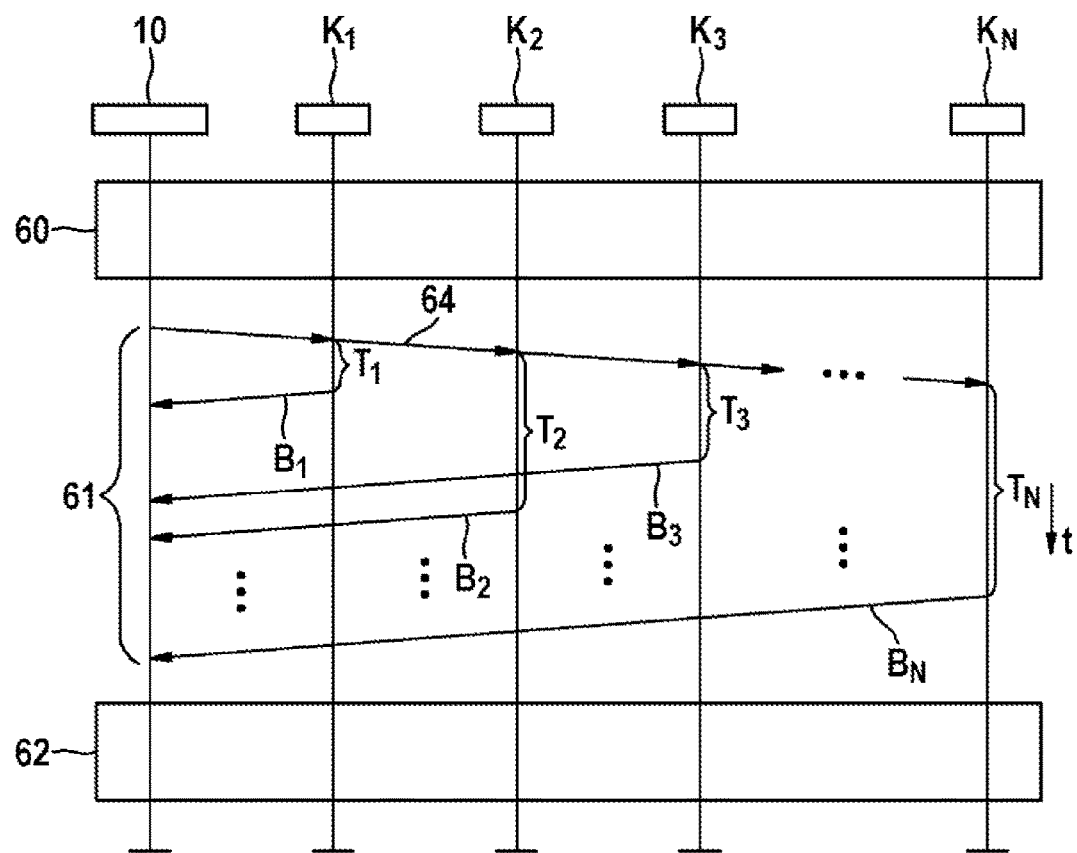
FIG. 6 schematically shows a communication method based on an embodiment of the present invention.

FIG. 6 schematically shows the timing of a communication method based on an embodiment of the present invention. The method comprises a phase 60 in which the communication system with the central entity 10 and the nodes $K_1, K_2, K_3, \ldots K_N$ uses a conventional media access method. In a subsequent phase 61, a fast parameter or state query and capture is made by the central entity 10. To this end, the latter sends a query message 64 to all nodes, querying one or more parameters or a state, such as a piece of information about the power supply or a transmission requirement (for example a transmission requirement whose priority reaches or exceeds a particular value).

As in the case of the query for a transmission requirement (for $n=1, \ldots, N$) each node $K_n$—after its node-specific response time $T_n$ from complete reception of the query message 64 has expired—sends a corresponding response message $B_n$ that contains the queried information.

The system then uses a basic media access method again in phase 62.

Figure 7A:
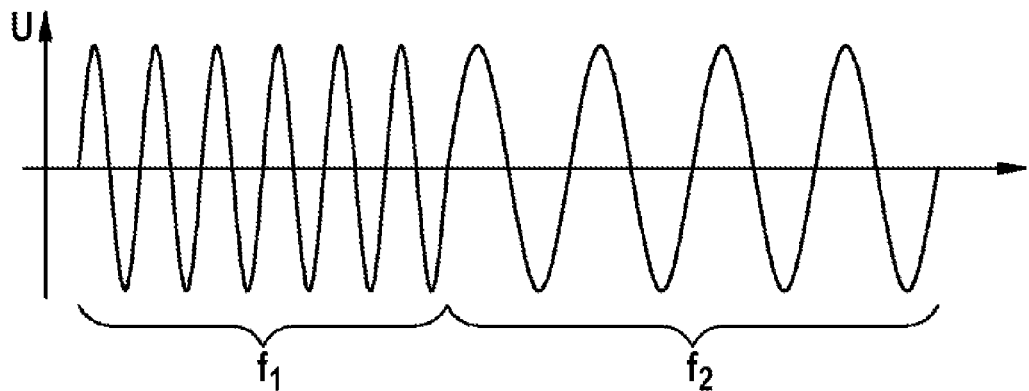
FIGS. 7a and 7b illustrate transmission of information with differential binary frequency shift keying, as can be used for the communication according to the invention.
Figure 7B:
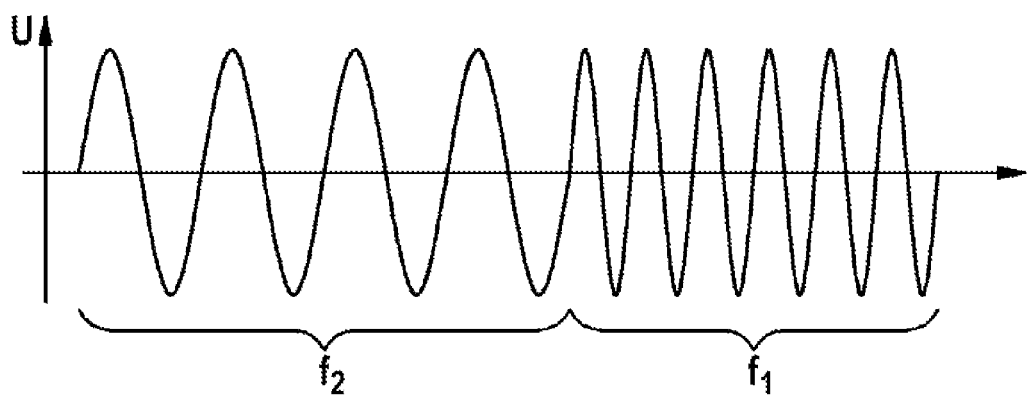

FIGS. 7a and 7b show options for bit transmission by means of differential binary frequency shift keying. In FIG. 7a, the bit '0' is in this case depicted by means of transition from a voltage profile at a first frequency $f_1$ to a second frequency $f_2$. In FIG. 7b, conversely, transition from the second frequency $f_2$ to the first frequency $f_1$ represents the bit '1'. In the case shown, the frequency $f_1$ is higher than the frequency $f_2$, but it may similarly also be lower.

The invention claimed is:

1. A communication method in a communication system having a control device, a plurality of nodes and a shared communication network, wherein the communication method comprises the following steps that are executed by an electronic processor of the control device:

sending, from the electronic processor of the control device, a query message via the shared communication network to one or more interrogated nodes in the communication system;

receiving, with the electronic processor of the control device, a plurality of response messages from the interrogated nodes, wherein the plurality of response messages are sent by the interrogated nodes in response to the query message;

determining, with the electronic processor of the control device, a node-specific time window for each of the interrogated nodes, wherein the node-specific time window for each of the interrogated nodes is based on a node-specific response time and a transmission time of the query message, wherein the node-specific response time is a time difference, specific to a respective interrogated node, between the query message being received and a response message being sent by the respective interrogated node;

evaluating, with the electronic processor of the control device, the plurality of response messages sent via the shared communication network by the interrogated nodes; and associating, with the electronic processor of the control device, each of the plurality of response messages with one of the interrogated nodes on the basis of the node-specific time window determined for each of the interrogated nodes.

2. A communication method in a communication system having a control device, a plurality of nodes and a shared communication network, wherein the communication method comprises the following steps that are executed by an electronic processor of a node from the plurality of nodes:

receiving, with the electronic processor of the node, a query message that is sent by the control device;

sending, with the electronic processor of the node, a response message to the control device at a node-specific response time in response to the query message, wherein the node-specific response time is a time difference, specific to a respective interrogated node, between the query message being received and a response message being sent by the respective interrogated node, wherein the node-specific response time is or has been assigned, communicated, or assigned and communicated to the node by the central entity, and wherein the response message is associated with the node by the control device based on a node-specific time window determined by the control device, the node-specific time window based on the node-specific response time and a transmission time of the query message.

3. The communication method as claimed in claim 1, wherein the electronic processor of the control device assigns, communicates, or assigns and communicates the node-specific response times of the interrogated nodes to the nodes.

4. The communication method as claimed in claim 1, which additionally comprises the steps that are executed by an interrogated node from the plurality of nodes as claimed in claim 2.

5. The communication method as claimed in claim 1, wherein the response messages are transmitted using differential shift keying, coherent binary shift keying, both differential and coherent binary shift keying, or multilevel frequency shift keying.

6. The communication method as claimed in claim 1, wherein the electronic processor of the control device additionally ascertains which of the interrogated nodes have a transmission requirement, or establishes that none of the interrogated nodes have a transmission requirement.

7. The communication method as claimed in claim 6, wherein the electronic processor of the control device awards an ascertained interrogated node with a transmission requirement for transmission of at least one message an exclusive opportunity for access to the shared communication network.

8. The communication method as claimed in claim 7, wherein the exclusive opportunity for access is temporary and ends when the at least one message is transmitted or after a stipulated period of time.

9. The communication method as claimed in claim 8, wherein after the end of the exclusive opportunity for access the electronic processor of the control device awards another interrogated node with a transmission requirement an exclusive opportunity for access.

10. The communication method as claimed in claim 8, wherein after the end of the exclusive opportunity for access the control device changes over the communication system to the use of another media access method, in which case the control device announces this change over.

11. The communication method as claimed in claim 7, wherein the control device awards the ascertained interrogated node the exclusive opportunity for access to the shared communication network by sending a special message to the ascertained interrogated node.

12. The communication method as claimed in claim 11, wherein the ascertained interrogated node transmits the at least one message in response to the special message.

13. The communication method as claimed in claim 1,
wherein the query message queries state information, prescribed parameters, or both state information and prescribed parameters, and/or
wherein the response messages contain state information, queried parameters, or both state information and queried parameters.

14. The communication method as claimed in claim 1, which additionally comprises establishment, by an interrogated node, that said node needs to send one or more time-critical messages, and wherein the response message indicates a transmission requirement for the interrogated node.

15. The communication method as claimed in claim 1, wherein the control device additionally ascertains what priority arises as the highest priority for messages to be sent from an interrogated node with a transmission requirement based on the response message.

16. The communication method as claimed in claim 1, wherein the node-specific time window is a time period within which the control device receives the response message from the interrogated node.

17. A computation device that is configured to be incorporated into a communication system having a plurality of nodes and a shared communication network and to act as a control device therein,
wherein the computation device comprises a memory and an electronic processor for processing instructions stored in the memory, and wherein the computation device is additionally configured to
send, from the electronic processor of the computation device, a query message via the shared communication network to one or more interrogated nodes in the communication system;
receive, with the electronic processor, a plurality of response messages from the interrogated nodes, wherein the plurality of response messages are sent by the interrogated nodes in response to the query message;
determine, with the electronic processor, a node-specific time window for each of the interrogated nodes, wherein the node-specific time window for each of the interrogated nodes is based on a node-specific response time and a transmission time of the query message, wherein the node-specific response time is a time difference, specific to a respective interrogated node, between the query message being received and a response message being sent by the respective interrogated node;
evaluate, with the electronic processor, the plurality of response messages sent via the shared communication network by the interrogated nodes; and
associate, with the electronic processor, each of the plurality of response messages with one of the interrogated nodes on the basis of the node-specific time window computed for each of the interrogated nodes.

18. A communication system having at least two nodes, a control device and a shared communication network,
wherein the control device comprises a memory and an electronic processor for processing instructions stored in the memory, and wherein the electronic processor is configured to
send a query message via the shared communication network to one or more interrogated nodes in the communication system;
receive a plurality of response messages from the interrogated nodes, wherein the plurality of response messages are sent by the interrogated nodes in response to the query message;
determine a node-specific time window for each of the interrogated nodes, wherein the node-specific time window for each of the interrogated nodes is based on a node-specific response time and a transmission time of the query message, wherein the node-specific response time is a time difference, specific to a respective interrogated node, between the query message being received and a response message being sent by the respective interrogated node;
evaluate the plurality of response messages sent via the shared communication network by the interrogated nodes; and
associate each of the plurality of response messages with one of the interrogated nodes on the basis of the node-specific time window determined for each of the interrogated nodes.

19. A non-transitory machine-readable storage medium having a computer program stored thereon that, when executed by an electronic processor of a computer, cause the electronic processor of the computer to
send a query message via a shared communication network to one or more interrogated nodes in a communication system;
receive a plurality of response messages from the interrogated nodes, wherein the plurality of response messages are sent by the interrogated nodes in response to the query message;
determine a node-specific time window for each of the interrogated nodes, wherein the node-specific time window for each of the interrogated nodes is based on a node-specific response time and a transmission time of the query message, wherein the node-specific response time is a time difference, specific to a respective interrogated node, between the query message being received and a response message being sent by the respective interrogated node;
evaluate the plurality of response messages sent via the shared communication network by the interrogated nodes; and
associate each of the plurality of response messages with one of the interrogated nodes on the basis of the node-specific time window determined for each of the interrogated nodes.

* * * * *